United States Patent [19]
Anderson

[11] Patent Number: 5,397,995
[45] Date of Patent: Mar. 14, 1995

[54] RAM VENT CAPACITANCE LEVEL PROBE WITH OVERFILL LEAK DETECTION CAPABILITIES

[76] Inventor: Robert V. Anderson, 4617 Ranch View Rd., Fort Worth, Tex. 76109

[21] Appl. No.: 50,888

[22] Filed: Apr. 21, 1993

[51] Int. Cl.$^6$ ............................................. G01F 23/26
[52] U.S. Cl. .................... 324/684; 324/690; 73/304 C
[58] Field of Search .................. 73/290 R, 304 C; 324/658, 663, 684, 690; 340/620

[56] References Cited

U.S. PATENT DOCUMENTS

| | | | |
|---|---|---|---|
| 2,377,275 | 5/1945 | Smith | 324/663 |
| 4,467,646 | 8/1984 | Berryman et al. | 73/304 C |
| 4,594,892 | 6/1986 | Asmundsson | 73/304 C |
| 4,806,847 | 2/1989 | Atherton et al. | 324/678 |
| 4,999,900 | 3/1991 | Anderson | 73/301 |
| 5,187,979 | 2/1993 | Edmark, III | 324/690 |

Primary Examiner—Kenneth A. Wieder
Assistant Examiner—Christopher M. Tobin
Attorney, Agent, or Firm—Charles D. Gunter, Jr.

[57] ABSTRACT

An improved capacitance level probe is shown which can be positioned within the return vapor passage of a coaxial vapor recovery refueling system for detecting changes in liquid level within an underground fuel storage tank. The level probe has an outer conductor, a spaced inner conductor, a closed upper end and a lower end with an end opening which allows liquid to enter and leave the interior of the probe as liquid level changes within the underground tank being monitored. A tubular impact vent is located at the upper end of the outer conductor and collects tank vapors from the return vapor passage in order to conduct such vapor pressure to the open interior of the outer conductor above the level of liquid within the outer conductor. This action prevents sudden pressure drops within the outer conductor as the level of fuel changes within the underground storage tank, thereby eliminating inaccuracies in the sensed capacitance of the unit.

8 Claims, 3 Drawing Sheets

RAM VENT CAPACITANCE LEVEL PROBE WITH OVERFILL LEAK DETECTION CAPABILITIES

BACKGROUND OF THE INVENTION

1. Field of the Invention:

The present invention relates to underground storage tank systems and to an improved capacitance level probe used to detect changes in liquid level within an underground storage tank.

2. Description of the Prior Art:

Underground storage tank systems are commonly employed for the storage of petroleum, hazardous chemicals and other products. For instance, most gasoline service stations, truck stops and similar facilities employ underground fuel storage tanks which are refilled by means of a riser pipe which extends upwardly from the buried tank into a relatively shallow manhole in the concrete apron of the location. The sides of the manhole are spaced a sufficient radial distance from the riser pipe to provide convenient access for coupling and uncoupling the supply hose of a supply truck to the top of the riser pipe. A fill tube extends within the riser pipe into the interior of the tank and is spaced concentrically within the riser pipe to thereby define an annular space between the fill tube and the riser pipe. The bottom of the manhole can be open or closed, e.g., cemented or filled with dirt or a mixture of pea gravel.

It is often advantageous to install a product monitoring device, such as a level monitoring device, within the interior of the underground storage tank, e.g., to report product levels for inventory control purposes, or in special operating modes to detect tank leakage.

The present invention has as its object to provide an improved capacitance level probe of the type which can be installed within an underground storage tank to monitor changes in liquid level.

The present invention also has as its object to provide a capacitance level probe which can be installed within the annular space between the riser pipe and fill tube with a minimum disruption to the existing storage tank installation, including the existing concrete apron which covers the buried storage tank.

Another object of the invention is to provide an improved capacitance level probe which accurately monitors changes in liquid level within an underground fuel storage tank, even during refueling operations when levels are changing rapidly.

Another object of the invention is to provide such a capacitance level probe which can be mounted at least partially within the annular space between the riser pipe and fill tube and which includes a pressure drop equalization feature to accommodate changes in pressure caused by changing velocity of vapors travelling through the annular space in a coaxial vapor recovery refueling arrangement.

Additional objects, features and advantages will be apparent in the written description which follows.

SUMMARY OF THE INVENTION

The improved capacitance level probe of the invention is positionable at least partly within the return vapor passage of a coaxial vapor recovery refueling system and is used to detect changes in liquid level within the associated underground fuel storage tank. The improved probe includes an elongated outer Conductor having an open interior, a closed upper end and a lower end. An elongated inner conductor is located within the open interior of the outer conductor and is initially separated therefrom. Spacer means are provided for maintaining the positional relationship of the inner and outer conductors.

The lower end of the outer conductor includes an end opening for allowing the ingress and egress of liquid as the level of liquid changes within the underground fuel storage tank. The presence of liquid within the open interior of the outer conductor serves to make electrical contact between the inner and outer conductors. As a result, changes in electrical capacitance are created by changes in the level of liquid within the open interior of the outer conductor.

A tubular ram or impact vent is located proximate the upper end of the outer conductor. The tubular ram or impact vent has a connecting end with a connecting opening for communicating with the open interior of the outer conductor, a length, and a collecting end with a collecting opening which concentrates tank vapors from the return vapor passage and conducts such vapor to the open interior of the outer conductor above the level of liquid within the outer conductor. The presence of the tubular impact vent prevents sudden pressure drops within the outer conductor as the level of fuel changes within the underground storage tank, such as during refueling operations.

Preferably, the outer conductor is a generally cylindrical member and the connecting end of the tubular impact vent extends outwardly from the cylindrical exterior thereof generally normal thereto. The impact vent also preferably has a curved length which orients the collecting end generally parallel to the cylindrical exterior of the outer conductor with the collecting end extending in the direction of the lower end of the outer conductor. The collecting end of the tubular impact vent is preferably a bell-shaped member with the collecting opening being of a greater diameter than the interior diameter of the remaining curved length of the impact vent.

In the method of detecting changes in liquid level of the invention, the capacitance level probe is installed at least partly within the return vapor passage of the coaxial vapor recovery refueling system. Changes in liquid level are detected by sensing changes in electrical capacitance created by changes in the level of liquid within the open interior of the outer conductor. Pressure changes within the capacitance probe caused by changes in liquid level in the underground fuel storage tank are balanced by introducing the ram or impact vapor pressure in the annular vapor passage to the interior of the outer conductor at a point above the liquid level therein.

DETAILED DESCRIPTION OF THE INVENTION

Figure 1:
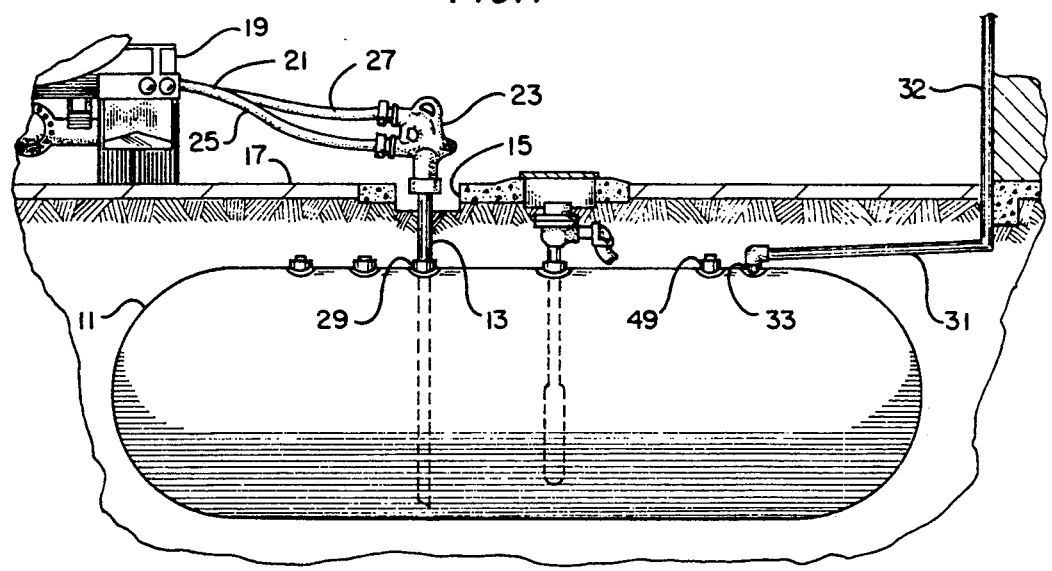
Figure 1 is a side, elevational view schematically illustrating a supply transport truck which is supplying fuel to a prior art underground fuel storage tank equipped with a riser pipe.

FIG. 1 shows a conventional underground storage system for petroleum, hazardous chemicals, or similar products. In the embodiment illustrated, the storage system is an underground fuel storage system of the type used to store petroleum products. The storage system includes an underground tank 11 which is refilled by means of a riser pipe 13 extending upwardly therefrom. The riser pipe 13 extends upwardly from the buried tank 11 into a relatively shallow manhole 15 in the concrete apron 17 of a service station. A supply truck 19 has a supply hose 21 which is coupled to the riser pipe 13 by means of a liquid vapor coupling 23. The coupling 23 is divided into a liquid passage 25 for supplying liquid through the riser pipe 13 to the tank 11 and a vapor passage 27 for simultaneously exhausting tank vapor back to the supply truck 19. The liquid vapor coupling 23 will be familiar to those skilled in the art and is commercially available, e.g., from Emco Wheaton of Conneaut, Ohio as the Model F298 coaxial elbow coupling.

In addition to the riser pipe 13 which extends from a tank bung 29 of the tank 11, the tank also includes a vent line 31 leading from a tank bung 33. The vent line 31 extends from the tank bung 33 on a rising slope to a vertical extent 32 which extends a substantial distance above the ground.

Figure 2:
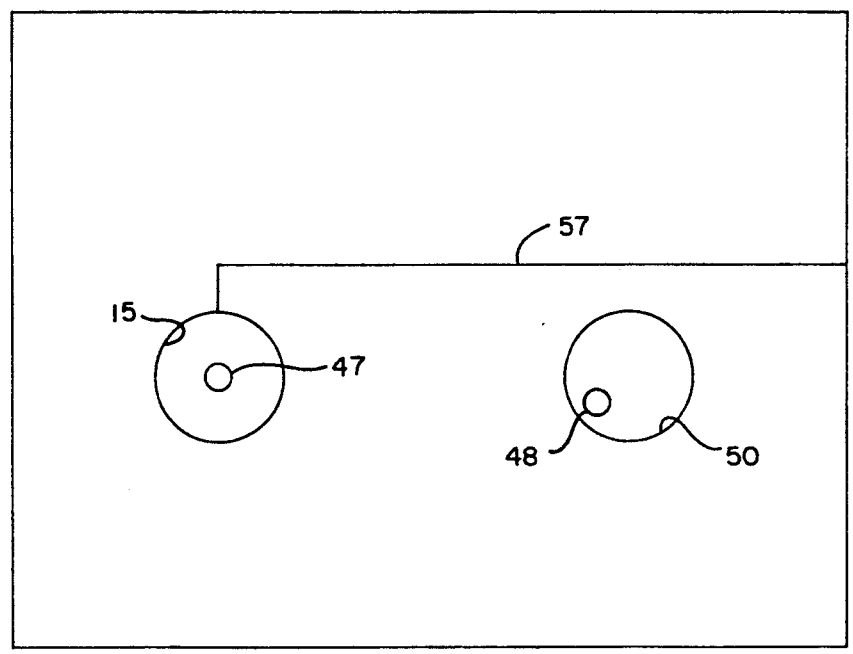
FIG. 2 is a top view of a portion of a concrete apron of the type which surrounds the underground storage tank of FIG. 1.
Figure 3:
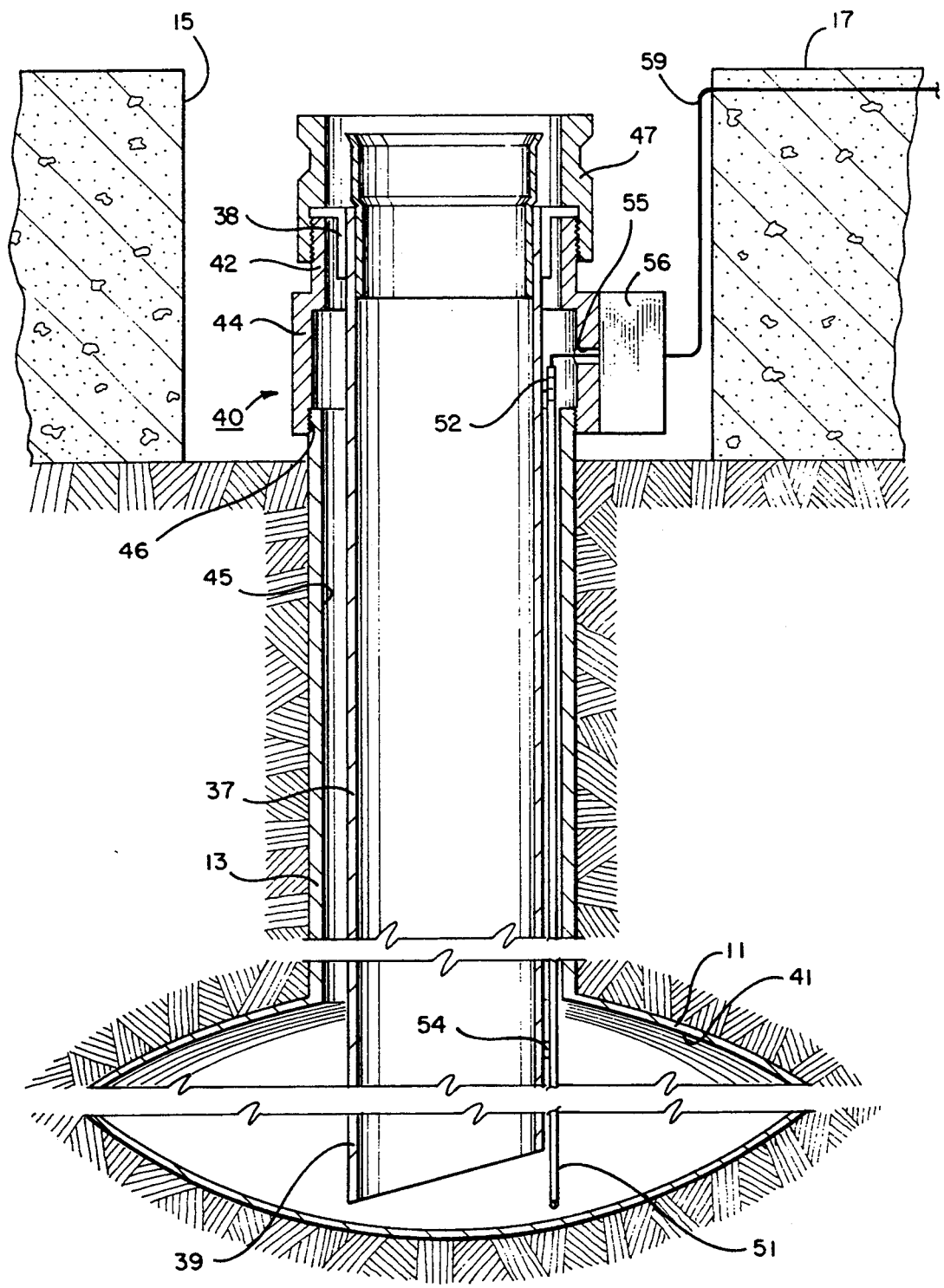
FIG. 3 is a partial, sectional view of the riser pipe and fill tube of the underground storage tank of FIG. 1, showing the improved capacitance level probe of the invention installed within the underground storage tank.

FIG. 3 is a close-up, sectional view of the riser pipe 13 and fill tube 37 found in the conventional underground storage tank 11 of FIG. 1, commonly referred to as a "coaxial vapor recovery system." The fill tube 37 has a lower end 39 which extends downwardly within the riser pipe 13 into the interior 41 of the underground storage tank 11. The fill tube 37 is spaced concentrically within the riser pipe 13 to thereby define an annular vapor space 45. Fill tube 37 can thus be seen to create an annular space which is used by the capacitance level probe of the invention which will be subsequently described. In the underground storage system illustrated in FIG. 3, the fill tube 37 is centered within the riser pipe 13 by means of a centering means, in this case collar 38 to create a concentric annular space 45. However, for purposes of this invention, the annular space can be non-concentric as well, as shown by the fill tube 48 in FIG. 2 which creates a non-concentric annular space 50. Returning to FIG. 3, an adapter 40 having a first cylindrical extent 42 and a second cylindrical extent 44 of greater external diameter engages an upper end of the riser pipe 13. For example, the cylindrical extent 44 can be internally threaded at 46 to engage the mating threads of the riser pipe 13, allowing the adapter to be screwed onto the upper end of the riser pipe. The adapter first cylindrical extent 42 is externally threaded and engages the mating internal threads of a nozzle coupling 47 which is provided with an external profile adapted to engage the liquid vapor coupling (23 in FIG. 1).

As previously described, the manhole 15 is a generally cylindrical opening providing a sufficient radial clearance to allow the attachment of the liquid vapor coupling 23. The manhole is installed within the concrete apron 17 surrounding the riser pipe 13. The size of the opening is thus fixed and cannot be readily enlarged without tearing out the existing concrete 17.

Previous product sensing devices were typically installed by tearing out the existing concrete apron at one of the additional bungs, i.e., 49 in FIG. 1. Such a retrofit operation usually meant that one or more days of retail sales were disrupted while the concrete apron was torn out and replaced. The installation itself was also quite expensive in terms of man hours and materials. One advantage of the present level probe is that it can be installed within the annular space (indicated at 53 in FIG. 3) without requiring that the concrete apron be excavated.

Figure 4:
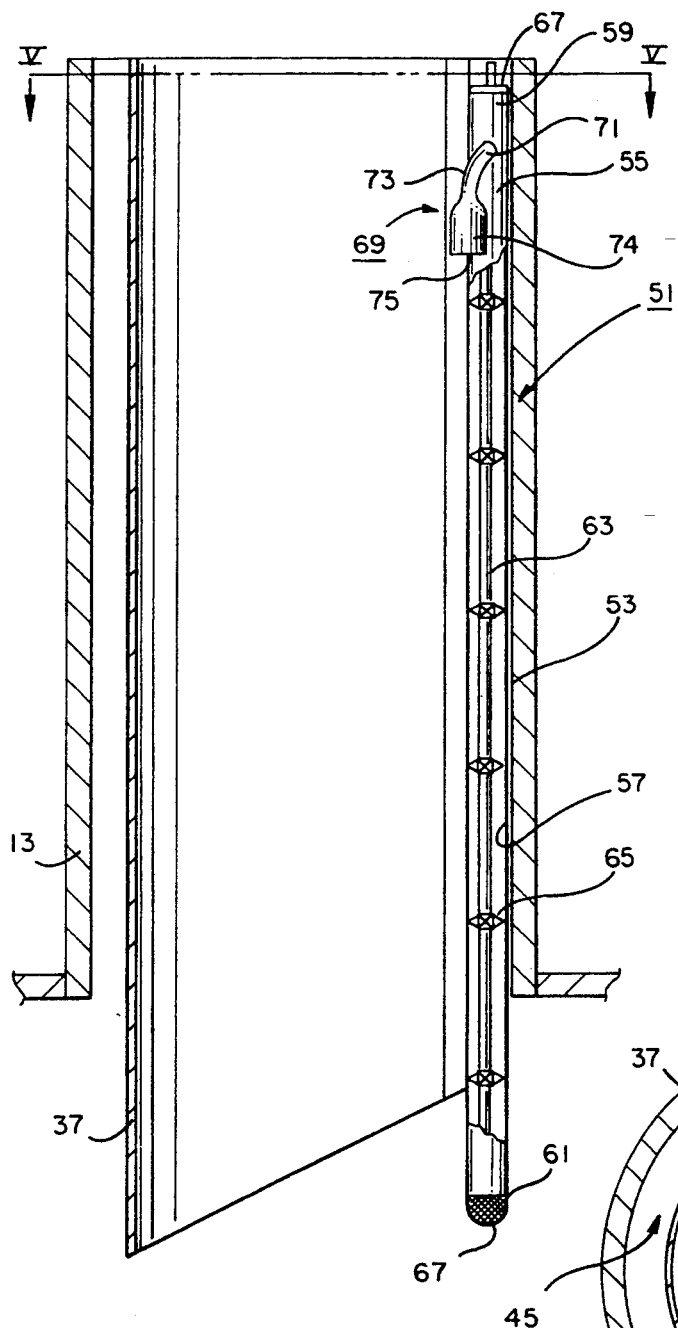
FIG. 4 is an isolated view, partly broken away, of the capacitance level probe of the invention in place within the annular space between the riser pipe and fill tube.

The improved capacitance level probe 51 of the invention is illustrated in greater detail in FIG. 4. Capacitance level probes are generally known in the art and typically feature a central conductor spaced apart from an outer tube by a void area. As the void is replaced by liquid, the capacitance of the device changes, allowing an extremely precise measurement of changes in liquid level.

The present capacitance level probe 51 has an elongated, outer conductor which has a cylindrical, conductive exterior 55, an open interior 57, a closed upper end 59 and a lower end 61. The conductive exterior 55 can conveniently be formed of metal or could be formed of other conductive materials such as, for example, graphite, for compatibility with exotic products. An elongated inner conductor 63 formed of a conductive material, in this case a metallic rod, is located within the open interior 57 of the outer conductor 53 and is initially separated therefrom. Any convenient insulating spacer means can be utilized to maintain the positional relationship of the inner and outer conductors 53, 63, respectively. In the embodiment of FIG. 4, a number of plastic insulating discs 65 are located at spaced intervals within the open interior 57 and serve to center and maintain the concentric relationship of the conducting rod 63 within the outer conductor 53. The upper end 59 is similarly closed by a dielectric insulating disc 67. As a result, the metallic rod which makes up the inner conductor 63 is initially insulated from the metallic outer conductor 53. The lower end 61 of the outer conductor 53 includes an end opening 67 for allowing the ingress and egress of liquid as the level of liquid changes within the underground fuel storage tank 11. The presence of liquid within the open interior 57 of the level probe serves to make electrical contact between the inner and outer conductors 53, 63. Preferably, the lower end opening 67 is covered by a mesh or screen to prevent the entrance of debris within the open interior 57.

Any of a number of available sensing means can be utilized to sense changes in electrical capacitance created by changes in the level of liquid within the open interior of the outer conductor 53. One preferred system will be described. In the embodiment of FIG. 3, the level probe 51 is supported in the annular space 45 on the fill tube 37 by means of clamps and rivets 52, 54 to prevent sway in the tank liquid. An electric cable 55 passes from the level probe out aperture 55 of the adapter 40. The cable joins a junction box 56, which houses a transmitter for the capacitance level signal of probe 51.

Cable means, such as a connector cable 59 are run from the junction box/transmitter 56 to a remotely located readout unit (not shown) by running the cable from the manhole 15 through a shallow trench (57 in FIG. 2) to the readout unit which is usually located within the retail establishment. A suitable junction box/transmitter 56 and remote readout unit are commercially available from Centroid Systems of Fort Worth, Tex. The cable can be, e.g., wire, coaxial or multiconductor cable and is preferably U.L. Style 2566 approved for direct burial. Preferably, the cable is $\frac{3}{8}$ inch or less diameter multiconductor cable.

The shallow trench is preferably saw cut approximately $\frac{3}{8}$ inches wide and 3 inches deep, as by using a diamond bladed concrete saw. The trench is cut through the wall of the manhole 15, through the concrete apron 17, and can be continued through any adjacent sidewalks and into the building housing the remote readout. Five or more $\frac{3}{8}$ inch diameter multiconductor cables from a plurality of underground storage tanks can then be stacked, one upon the other within the 3 inch deep trench. The top of the trench 57 is then filled with concrete or a caulking compound once the cable or cables are installed. Because of the small width and shallow depth of the saw cut trench, the end result has the appearance of an expansion joint in the concrete apron (see FIG. 2).

Figure 5:
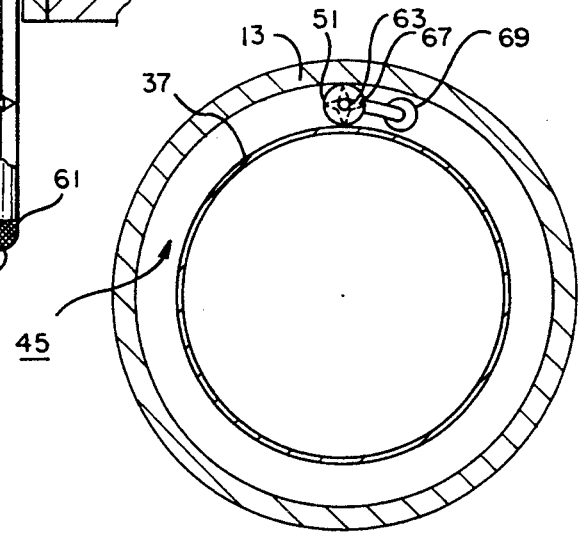
FIG. 5 is a cross-sectional view taken along lines V—V in FIG. 4.

Typical prior art capacitance level probes of the type under consideration have generally featured a small vent opening adjacent the closed upper end 59 of the level probe for venting vapor as liquid entered the end opening 67 and began to rise within the probe. Rapid changes in liquid level within the underground fuel storage tank, as during refueling operations, has been found to cause pressure drop errors when sensing the changes in capacitance within the level probe 51. This phenomenon can best be described with respect to the areas indicated as $A_1$ and $A_2$ in FIG. 5:

If the pressure before start of fuel drop is equal in the storage tank and level probe, then the pressure in $A_2=$ pressure in $A_1=$ pressure inside fuel tank and the probe. Calculating the areas $A_1$ and $A_2$ for a typical installation can be done as follows:

$$A_1 = \frac{\pi}{4}(3.12)^2 = \frac{7.645 \, \overline{in}^2}{144} = 0.053 \, \overline{ft}^2$$

$$A_2 = \frac{\pi}{4}(\overline{4.03}^2 - \overline{3.25}^2) = \frac{4.46 \, \overline{in}^2}{144} = .031 \, \overline{ft}^2$$

A fuel drop of $$250 \frac{gal}{min}$$

is equal to $$33.42 \frac{\overline{ft}^3}{min} : \frac{\overline{ft}^3}{min} = \frac{(250 \, gal/min)(231 \, \overline{in}^3/gal)}{1728 \, \overline{in}^3/ft^3} = 33.42 \, \overline{ft}^3/min$$

The velocity in $A_1$ and $A_2$ can then be calculated as follows:

$$\text{Velocity in } A_1 = \frac{33.42 \frac{\overline{ft}^3}{min}}{.053 \, \overline{ft}^2 \times 60 \frac{sec}{min}} = 10.5 \frac{ft}{sec}$$

-continued
$$\text{Velocity in } A_2 = \frac{33.42}{.031 \times 60} = 18.0 \frac{ft}{sec}$$

When fuel starts to enter the storage tank through the fill tube interior $A_1$ at $$33.42 \frac{\overline{ft}^3}{min},$$

the same $$33.42 \frac{\overline{ft}^3}{min}$$

of vapor/air must exit $A_2$.

Since $A_2 < A_1$ then the velocity in $A_2$ is 1.71 times the velocity in $A_1$, i.e., 18.0 divided by 10.5. This increase in velocity in $A_2$ causes a pressure drop in $A_2$. In practice, this $\Delta P$ was found to cause fuel in the probe to rise unexpectedly in probes of the prior art design. The result was an unexpected rise in the fuel probe which was much higher than the corresponding rise of the actual fuel level in the storage tank. The pressure drop in $A_2$ due to higher velocity is about $-0.8$ psi. This would equate to a sensed level rise of approximately 21 inches with the prior art vent design for diesel fuel and a rise of approximately 28 inches for gasoline.

The improved capacitance level probe 51 of the invention solves the above problem through the use of a tubular impact vent (69 in FIG. 4). The term "impact" is taken in this sense to mean "to force tightly together, to pack or to wedge." The tubular impact vent is located approximate the upper end 59 of the probe and has a connecting end with a connecting opening 71 for communicating with the open interior 57 of the outer conductor 53. The impact vent 69 also has a length including a curved portion 73 and has a collecting end 74 with a collecting opening 75 which concentrates tank vapors from the return vapor passage 45, thereby producing a "ram" effect within the open interior 57 of the outer conductor 53 acting upon the level of liquid within the outer conductor. The term "ram" is taken in this context to mean "to drive into, to force into place, to press or drive down or to cram into place." The velocity, or ram impact effect of the vapor in the annular space 45 concentrates the effect of the higher velocity in $A_2$ in such a manner as to maintain the same, equal pressure conditions in $A_1$ and $A_2$ both prior to and after delivery of product to the tank.

Preferably, the connecting end of the tubular impact vent 69 extends outwardly from the cylindrical exterior 55 of the outer conductor 53 generally normal thereto. The length of the tubular vent 69 defined between the connecting end 71 and collecting end 74 is curved, as shown in FIG. 4, whereby the collecting end 74 is oriented generally parallel to the cylindrical exterior 55 of the outer conductor 53 and extends in the direction of the lower end 61 of the level probe. Preferably, the collecting end 74 is a bell-shaped member and the collecting opening 75 has a greater relative diameter than the internal diameter of the curved length portion 73 thereof. The diameter of the collecting end 74 is preferably no less than about 80% of the diameter of the outer conductor 53, but should not exceed the diameter of the outer conductor 53.

The entire exterior of the probe 51, including the ram, impact vent 69 is preferably covered by a thin coating of a heat shrink TEFLON to insulate the probe from any transient electrical effects encountered in the tank. These transient effects can be caused, for example, by corrosion protection equipment, subway or trolley lines, lightening strikes, etc.

By creating a "counterflow" of vapor and, in effect, placing the increased velocity in $A_2$ on top of the liquid level within the interior of the probe prevents any false rises detected by the sensing means due to pressure fluctuations. The impact or ram effect of vapor entering the collecting opening 75 exactly offsets the pressure drop which would otherwise occur without the use of the tubular impact vent 69. Thus, $PA_1 = PA_2$, if vent 69 is so oriented as to face the higher vapor velocity in $A_2$. As a result of the ram or impact effect produced by vent 69, the rise in level in the probe 51 is due to the exact change in level of product in the storage tank. Table 1 shows actual sensed readings utilizing a prior art probe for an actual diesel fuel dump with the prior art vent. The readings are taken at 15 second intervals. Note that at reading 2 the sensed level jumped immediately from 19.9 to 41.0 indicating input of 1080 gallons in 15 seconds, and at reading 15, the sensed level jumped from 49.6 to 69.3, a 20 inch change due to the change in vapor velocity within the annular space. The 20 inch change indicates a 2524 gallon input in 15 seconds. Table 2 shows the much more linear changes in level detected in a double manifold tank utilizing the improved probe having the tubular impact vent of the invention.

It should also be noted that in the case of a 10,000 gallon tank (96 inches deep), the false readings generated at readings 27 and 29 in Table 1 would have triggered an automatic overfill alarm at reading 27 and would have triggered an overfill condition alarm at reading 29.

TABLE 1

| Reading | Inches | Gallons |
|---|---|---|
| 1 | 19.9 | 1502 |
| 2 | 41.0 | 2583 |
| 3 | 39.4 | 2373 |
| 4 | 42.9 | 2833 |
| 5 | 43.7 | 2939 |
| 6 | 42.6 | 2794 |
| 7 | 42.3 | 2754 |
| 8 | 46.8 | 3351 |
| 9 | 46.7 | 3338 |
| 10 | 44.9 | 3098 |
| 11 | 46.0 | 3244 |
| 12 | 49.9 | 3763 |
| 13 | 52.7 | 4134 |
| 14 | 49.2 | 3670 |
| 15 | 49.6 | 3723 |
| 16 | 69.3 | 6247 |
| 17 | 73.1 | 6689 |
| 18 | 89.0 | 8196 |
| 19 | 74.7 | 6868 |
| 20 | 87.0 | 8049 |
| 21 | 89.1 | 8203 |
| 22 | 87.9 | 8114 |
| 23 | 91.3 | 8342 |
| 24 | 89.2 | 8210 |
| 25 | 88.4 | 8154 |
| 26 | 92.3 | 8397 |
| 27 | 95.2 | 8511 |
| 28 | 90.9 | 8319 |
| 29 | 96.6 | 8524 |
| 30 | 93.7 | 8461 |
| 31 | 94.6 | 8494 |
| 32 | 97.1 | 8524 |
| 33 | 97.5 | 8524 |
| 34 | 94.7 | 8497 |

TABLE 1-continued

| Reading | Inches | Gallons |
|---|---|---|
| 35 | 96.6 | 8524 |
| 36 | 94.6 | 8494 |
| 37 | 96.6 | 8524 |
| 38 | 97.4 | 8524 |
| 39 | 96.9 | 8524 |
| 40 | 101.2 | 8524 |
| 41 | 99.0 | 8524 |
| 42 | 100.7 | 8524 |
| 43 | 100.0 | 8524 |
| 44 | 100.6 | 8524 |
| 45 | 101.3 | 8524 |
| 46 | 98.8 | 8524 |
| 47 | 100.8 | 8524 |
| 48 | 99.8 | 8524 |
| 49 | 101.7 | 8524 |
| 50 | 102.8 | 8524 |
| 51 | 100.8 | 8524 |
| 52 | 101.3 | 8524 |

TABLE 2

| Reading | Inches | Gallons |
|---|---|---|
| 1 | 35.3 | 788 |
| 2 | 36.3 | 1046 |
| 3 | 37.1 | 1252 |
| 4 | 37.9 | 1447 |
| 5 | 38.7 | 1668 |
| 6 | 39.5 | 1864 |
| 7 | 40.3 | 2087 |
| 8 | 41.4 | 2363 |
| 9 | 42.2 | 2587 |
| 10 | 43.0 | 2785 |
| 11 | 43.6 | 2956 |
| 12 | 44.5 | 3181 |
| 13 | 45.2 | 3379 |
| 14 | 46.1 | 3605 |
| 15 | 47.0 | 3843 |
| 16 | 47.8 | 4068 |
| 17 | 48.5 | 4240 |
| 18 | 49.2 | 4439 |
| 19 | 49.9 | 4624 |
| 20 | 50.7 | 4823 |
| 21 | 51.4 | 5021 |
| 22 | 52.0 | 5166 |
| 23 | 52.7 | 5350 |
| 24 | 53.4 | 5544 |
| 25 | 54.1 | 5731 |
| 26 | 55.1 | 5980 |
| 27 | 55.6 | 6123 |
| 28 | 56.3 | 6291 |
| 29 | 57.0 | 6414 |
| 30 | 57.6 | 6642 |
| 31 | 58.3 | 6810 |
| 32 | 59.1 | 7015 |
| 33 | 59.8 | 7194 |
| 34 | 60.4 | 7360 |
| 35 | 60.9 | 7472 |
| 36 | 60.8 | 7458 |
| 37 | 60.9 | 7472 |
| 38 | 61.0 | 7497 |
| 39 | 60.9 | 7472 |
| 40 | 60.9 | 7485 |
| 41 | 60.8 | 7460 |
| 42 | 60.8 | 7461 |
| 43 | 60.8 | 7448 |
| 44 | 60.8 | 13355 |
| 45 | 60.8 | 13355 |

The capacitance level probe 51 can be installed within the underground fuel storage tank by first unscrewing the nozzle coupling 47 and pulling out the existing fill tube 37 and collar 38. The collar 38 is then placed on top of the adapter 40 and the nozzle coupling 47 is screwed onto the adapter 40. The probe 51 is attached to the fill tube, as by clamps 54 and the complete assembly can then be inserted into the riser pipe 13 and with the threads 46 of the adapter 40 being engaged with the mating threaded surface of the riser pipe. Generally, the lower end 61 of the probe will extend to within a few inches of the bottom surface of the storage tank 11 and the closed upper end 59 will extend along a substantial portion of the vertical height of the annular space 45 which constitutes the coaxial vapor return passage of the system.

In the case of a 96 inch, 10,000 gallon underground storage tank, the probe will extend approximately 90 inches to the opening of the riser pipe and on the order of 26 inches into the annular space 45 within the riser pipe for a typical installation.

Alternatively, the fill tube 37 can be provided from the factory with the adapter 40 and the attached level probe 51 so that installation merely involves removing the existing fill tube 37 and installing the complete retrofit assembly. This procedure allows the annular space 45 to be varied to accommodate sensors 51 of varying sizes, for example for providing fill tube 37 as a necked-down version of the fill tube shown in FIG. 3.

Once the fill tube 37 and associated level probe have been installed, a cable 59 is used to connect the probe to the remotely located computer and/or readout equipment which are used to sense changes in the capacitance of the unit.

In operation, the capacitance level probe 51 of the invention is positioned at least partly within the return vapor passage of the coaxial vapor recovery refueling system. As liquid from the tank enters the open interior 57 of the probe 51, the presence of liquid serves to make electrical contact between the inner and outer conductors, thereby causing a change in the sensed electrical capacitance of the unit. Such changes in capacitance can be correlated with changes in liquid level within the underground fuel storage tank with great precision. Pressure changes within the capacitance probe caused by changes in the liquid level in the underground fuel storage tank are balanced by introducing vapor pressure in the annular vapor passage (45 in FIG. 3) to the interior of the outer conductor 53 at a point above the liquid level therein. As a result, sudden pressure drops within the outer conductor e.g. readings 15–16 in Table 1, are prevented even where the level of fuel within the underground fuel storage tank changes dramatically.

Because the probe of the invention is installed at least partly within the annular vapor space 45 (i.e. high within the riser pipe), the storage tank can be purposefully overfilled into the annular space 45 for leak detection. This is possible because of the amplification of the level change due to a leak effect. As an example, the amount of fluid in one foot of a standard riser pipe 13 is about 0.66 gal/ft or 0.055 gal/in. If the probe 51 measures to an accuracy of 1/10 inch, then it can detect leaks as small as 0.0055 gallons per hour. This is a precision greater than required by present United States EPA standards.

An invention has been provided with several advantages. The installation method of the invention allows a level monitoring device to be installed on an underground storage tank with a minimum of disruption to the existing concrete apron or to the retail operations of the installation utilizing the underground storage tank. The installation normally takes only a couple of hours time with minimal manual labor and materials. It is not necessary to tear out the existing concrete apron or manhole area. The improved probe provides extremely precise measurement of changes of liquid level within the underground fuel storage tank. The unique tubular impact vent feature of the probe balances pressure changes which would otherwise affect the accuracy of the readings obtained.

While the invention has been shown in only one of its forms, it is not thus limited but is susceptible to various changes and modifications without departing from the spirit thereof.

What is claimed is:

1. An improved capacitance level probe positionable at least partly within the return vapor passage of a coaxial vapor recovery refueling system for detecting changes in liquid level within an underground fuel storage tank, the capacitance level probe comprising:

an elongated outer conductor having a generally cylindrical exterior, an open interior, a closed upper end and a lower end;

an elongated inner conductor located within the open interior of the outer conductor and initially separated therefrom;

spacer means located within the open interior of the outer conductor for securing the inner conductor within the open interior thereof and for insulating the inner conductor from the outer conductor;

wherein the lower end of the outer conductor includes an end opening for allowing the ingress and egress of liquid as the level of liquid changes within the underground fuel storage tank, the presence of liquid within the open interior of the outer conductor serving to make electrical contact between the inner and outer conductors;

a tubular impact vent connected proximate the upper end of the outer conductor by means of a connecting end with a connecting opening which communicates with the open interior of the outer conductor, the tubular vent also having a collecting end with a collecting opening which collects and concentrates tank vapors from the return vapor passage and conducts such vapor pressure to the open interior of the outer conductor above the level of liquid within the outer conductor, thereby preventing sudden pressure drops within the outer conductor as the level of fuel changes within the underground storage tank; and wherein the connecting end of the tubular impact vent extends outwardly from the cylindrical exterior of the outer conductor generally normal thereto and wherein the tubular impact vent also includes a curved portion between the connecting end and the collecting end, whereby the collecting end is oriented generally parallel to the cylindrical exterior of the outer conductor and extends in the direction of the lower end thereof.

2. The capacitance level probe of claim 1, wherein the collecting end of the tubular impact vent is a bell shaped member and wherein the collecting opening has a greater diameter than the internal diameter of the remaining curved length thereof.

3. The capacitance level probe of claim 1, wherein both the elongated outer conductor and the tubular impact vent are coated with an insulated coating to thereby insulate the probe from any transient electrical effects encountered within the underground storage tank.

4. The capacitance level probe of claim 3, wherein the
insulated coating is heat shrink polytetrafluoroethylene.

5. In an underground storage tank system of the type having an interior space and having a riser pipe extending upwardly therefrom to the surface of the ground, the riser pipe having an open interior surface which communicates with the interior space of the underground fuel storage tank and a fill tube installed within the interior surface of the riser pipe, the fill tube having an upper end, a lower end and an exterior surface which defines a coaxial vapor recovery refueling system having an annular space created between the exterior surface of the fill tube and the interior surface of the riser pipe, the annular space defining a return vapor passage of the system, the improvement comprising:

a capacitance level probe positioned at least partly within the return vapor passage of the coaxial vapor recovery refueling system for detecting changes in liquid level within the underground fuel storage tank, the capacitance level probe having an elongated outer conductor having an open interior, a closed upper end and a lower end;

an elongated inner conductor located within the open interior of the outer conductor and initially separated therefrom;

spacer means for maintaining the positional relationship of the inner and outer conductors;

wherein the lower end of the outer conductor includes an end opening for allowing the ingress and egress of liquid as the level of liquid changes within the underground fuel storage tank, the presence of liquid within the open interior of the outer conductor serving to make electrical contact between the inner and outer conductors;

sensing means for sensing changes in electrical capacitance created by changes in the level of liquid within the open interior of the outer conductor;

a tubular impact vent located proximate the upper end of the outer conductor having a connecting end with a connecting opening for communicating with the open interior of the outer conductor and having a collecting end with a collecting opening which collects and concentrates tank vapors from the return vapor passage and conducts such vapor concentration to the open interior of the outer conductor above the level of liquid within the outer conductor; and wherein the outer conductor has a generally cylindrical exterior and wherein the connecting end of the tubular impact vent extends outwardly from the cylindrical exterior of the outer conductor generally normal thereto and wherein the tubular impact vent includes a curved portion between the connecting end and the collecting end, whereby the collecting end is oriented generally parallel to the cylindrical exterior of the outer conductor and extends in the direction of the lower end thereof.

6. The underground storage tank system of claim 5, wherein the collecting end of the tubular impact vent is a bell shaped member and wherein the collecting opening has a greater diameter than the internal diameter of the remaining curved length thereof.

7. A method for detecting changes in the level within an underground fuel storage tank system of the type having an interior space and having a riser pipe extending upwardly therefrom to the surface of the ground, the riser pipe having an open interior surface which communicates with the interior space of the underground fuel storage tank and wherein a fill tube is installed within the interior surface of the riser pipe, the fill tube having an upper end, a lower end and an exterior surface thereby defining a coaxial vapor recovery refueling system having an annular space created between the exterior surface of the fill tube and the interior surface of the riser pipe, the annular space defining a return vapor passage of the system, the method comprising the steps of:

positioning a capacitance level probe at least partly within the return vapor passage of the coaxial vapor recovery refueling system for detecting changes in liquid level within the underground fuel storage tank, the capacitance level probe having an elongated outer conductor having an open interior, a closed upper end and a lower end, the level probe also having an elongated inner conductor located within the open interior of the outer conductor and initially separated therefrom, the lower end of the outer conductor being provided with an end opening for allowing the ingress and egress of liquid as the level of liquid changes within the underground fuel storage tank, the presence of liquid within the open interior of the outer conductor serving to make electrical contact between the inner and outer conductors;

sensing changes in electrical capacitance created by changes in the level of liquid within the open interior of the outer conductor in order to correlate such changes in capacitance with changes in liquid level in the underground fuel storage tank;

balancing pressure changes within the capacitance probe caused by changes in liquid level in the underground fuel storage tank by concentrating and introducing vapor pressure in the annular vapor passage to the interior of the outer conductor at a point above the liquid level therein;

wherein vapor pressure is introduced to the interior of the outer conductor by means of a tubular impact vent located proximate the upper end of the outer conductor having a connecting end with a connecting opening for communicating with the open interior of the outer conductor and having a collecting end with a collecting Opening which concentrates tank vapors from the return vapor passage and conducts such vapor pressure to the open interior of the outer conductor above the level of liquid within the outer conductor; and wherein the connecting end of the tubular impact vent is connected to extend outwardly from the cylindrical exterior of the outer conductor generally normal thereto and wherein the tubular impact vent also includes a curved portion between the connecting end and the collecting end, whereby the collecting end is oriented generally parallel to the cylindrical exterior of the outer conductor and extends in the direction of the lower end thereof.

8. The method of claim 7, wherein the collecting end of the tubular impact vent is shaped in the form of a bell and wherein the collecting opening is provided having a greater diameter than the internal diameter of the remaining curved length thereof.

* * * * *